United States Patent

[11] 3,626,261

| | | |
|---|---|---|
| [72] | Inventor | Donald M. Ham<br>Rochester, N.H. |
| [21] | Appl. No. | 83,395 |
| [22] | Filed | Oct. 23, 1970 |
| [45] | Patented | Dec. 7, 1971 |
| [73] | Assignee | General Electric Company |

[54] PORTABLE MULTIRATE ELECTRIC IMPULSE GENERATOR EMPLOYING A PLURAL MOTOR DIFFERENTIAL GEAR DRIVE
11 Claims, 4 Drawing Figs.

[52] U.S. Cl. ................................................. 318/8, 73/432 R
[51] Int. Cl. ..................................................... H02p 7/68
[50] Field of Search .......................................... 322/31, 38, 39, 52, 94; 307/271; 335/205; 318/8

[56] References Cited
UNITED STATES PATENTS

| | | | |
|---|---|---|---|
| 2,695,376 | 11/1954 | Emms et al. .................. | 322/31 X |
| 3,249,713 | 5/1966 | Briggs........................... | 335/205 |
| 3,575,621 | 4/1971 | Voland et al. ................ | 318/8 X |

*Primary Examiner*—T. E. Lynch
*Assistant Examiner*—H. Huberfeld
*Attorneys*—Francis X. Doyle, Vale P. Myles, Frank L. Neuhauser, Oscar B. Waddell and Joseph B. Forman

ABSTRACT: A portable electric impulse generator is provided having an impulse triggering reed switch that is actuated by a rotatable magnet which, in turn, is driven at various preselected rates of speed by a differential gear train. The differential gear train is driven at a rate determined by the selective energization of a plurality of synchronous motors that are operatively coupled to input gears of the gear train.

Inventor,
Donald M. Ham,
by Vale P. Myles
His Attorney.

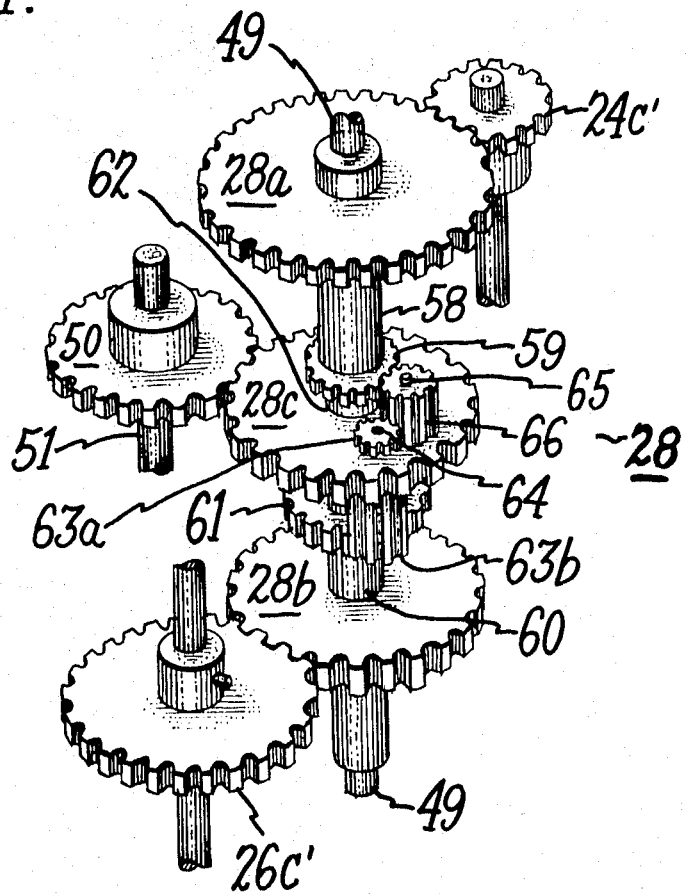

PORTABLE MULTIRATE ELECTRIC IMPULSE GENERATOR EMPLOYING A PLURAL MOTOR DIFFERENTIAL GEAR DRIVE

It is common practice in many industries to use measuring or counting devices that are actuated in response to electrical impulses fed into it at a random rate. For example, electric demand meters of a type currently in widespread use frequently employ a printing stylus that is actuated a variable number of times within successive 15-minute intervals to advance the stylus in this variable number of increments during these intervals. Since it is often necessary to verify the accuracy of such impulse actuated devices, it would be desirable to have available in laboratories and utility meter test shops an impulse generating apparatus that could be used as a standard against which to check and precisely calibrate such devices. Moreover, it would be desirable to have a number of conveniently usable different rates of impulse speed available from such a standard test apparatus so that a large number of different rates may be tested with it.

In addition to its use as a calibrating apparatus for impulse measuring or actuated devices, such an impulse generator might be used to perform life testing of electrical components. For example, electric lamps could be life tested by energizing them with such an impulse generator at a given preselected rate of energizing impulses. When the lamp finally failed, it would only be necessary to note the duration of the test to ascertain the number of successful operations performed before such failure.

Prior to the present invention, it has generally been necessary to construct specialized impulse generating apparatus in order to test or verify an impulse rate for a given electrical device. Such specialized equipment is necessarily quite expensive, and it is often only available at laboratories or service shops. The expense and inconvenience of the prior art practices makes it apparent that there presently exists a need for a reliable, variable rate impulse generating ]pparatus for testing impulse operated devices such as electric demand meters at, or conveniently near, their normal place of use. Of course, in addition to being reliable and accurate, as a practical matter such a multirate impulse generator must be portable and it must be ruggedly constructed so that it will not lose its accuracy when subjected to normal field usage. Finally, such an impulse generator must be of a sufficiently simplified construction to enable it to be manufactured in relatively low quantities at a reasonable cost that will make its acquisition by a reasonable number of test shops and laboratories a feasible alternative to present expedients.

Accordingly, it is a primary object of the present invention to provide a multirate impulse generator that accurately and reliably affords a large number of individually selectable rates of impulse from a portable test device.

Another object of the invention is to provide a multirate impulse generator that is economical to manufacture and is rugged in construction so that it does not vary its impulse rate due to normal rough handling encountered in field use.

A further object of the invention is to provide a multirate impulse generator that is not subjected to variations in its rates of output due to changes in ambient conditions such as temperature, humidity or pressure.

Further objects and advantages of the invention will become apparent to those skilled in the art from the following description of it taken in connection with the accompanying drawings.

In one preferred embodiment of the invention, a multirate impulse generator is formed by mounting four synchronous electric motors on a suitable supporting frame in driving relationship, respectively, with four reduction gear trains that are coupled together in a differential gear system. A 15-position selector switch is connected to control the selective energization of the motors so that any given motor or any given combination of the four motors can be actuated at one time to drive the differential gear system and cause it to rotate an output shaft at any one of 15 output speeds, corresponding to one of the 15 positions of the selector switch in which it is set at that time. A magnet is mounted for rotation by the output shaft and this magnet operates a reed switch which is electrically connected to a source of power so that each operation of the switch generates an impulse. The impulses generated by the reed switch are subsequently amplified and transmitted to output terminals which may be connected to a device that is to be calibrated or tested. A counter is also provided in this preferred embodiment of the invention to count the number of impulses generated by the reed switch. In the drawings:

FIG. 4 is an enlarged, perspective view of a differential gear subassembly system of a type that is embodied in the impulse rate control assembly depicted in FIG. 3 of the drawing.

Figure 1:
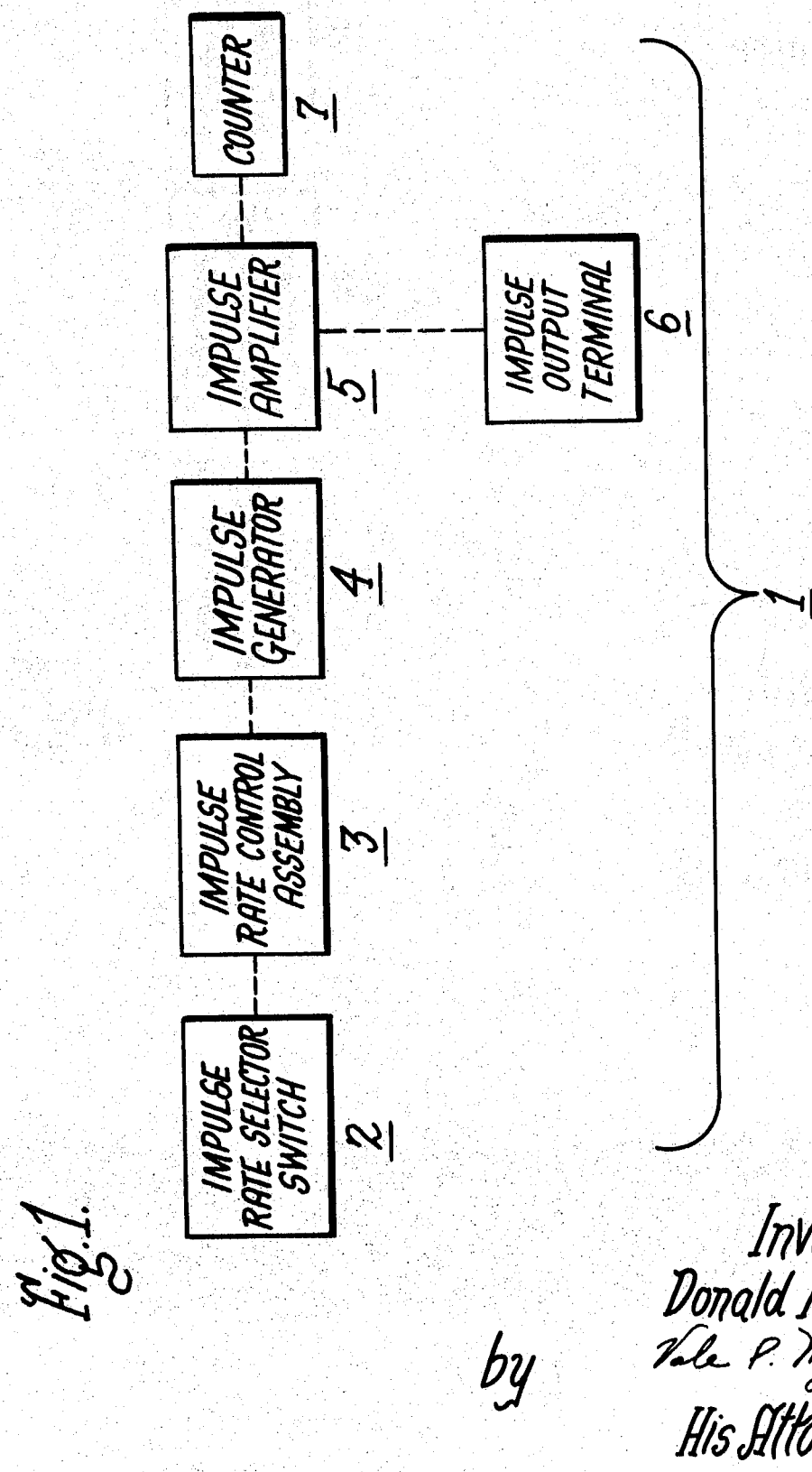
FIG. 1 is a schematic block diagram of the basic operating component parts of an impulse generator constructed and arranged pursuant to the present invention.

One preferred embodiment of my invention will now be described with reference to the accompanying drawings. It should be understood that throughout the various figures of these drawings, like reference numerals are used to designate like component parts. In order to facilitate an understanding of the structural details of the component parts of this embodiment of my invention, it may be helpful to first understand the functions performed by the basic component parts, or subassemblies, of the multirate electrical impulse generator disclosed herein. Toward this end, there is shown in FIG. 1 of the drawing, to which reference may now be made, a block diagram that schematically illustrates the basic functions, and their sequential interrelation, in the impulse generator that will be described in greater detail below. As shown in FIG. 1, the impulse generator 1 includes an impulse rate selector switch 2 that is operatively connected to an impulse rate control assembly 3, which in turn actuates an impulse generator 4 that produces electrical impulses that are fed into an impulse amplifier 5. The output of the impulse amplifier 5 is made available at an output terminal 6, and is monitored by a counter 7 that operates to visually indicate the number of impulses generated by the generator 4.

It should be apparent that for some applications it may not be necessary to amplify the impulses generated by the generator 4 and, of course, it is not necessary to provide a counter, such as counter 7, to visually indicate the number of pulses generated. Accordingly, for such applications, the output of impulse generator 4 may be directly connected to output terminal 6, or it may be directly connected to a given load, such as an electric demand meter that is to be tested.

Figure 2:
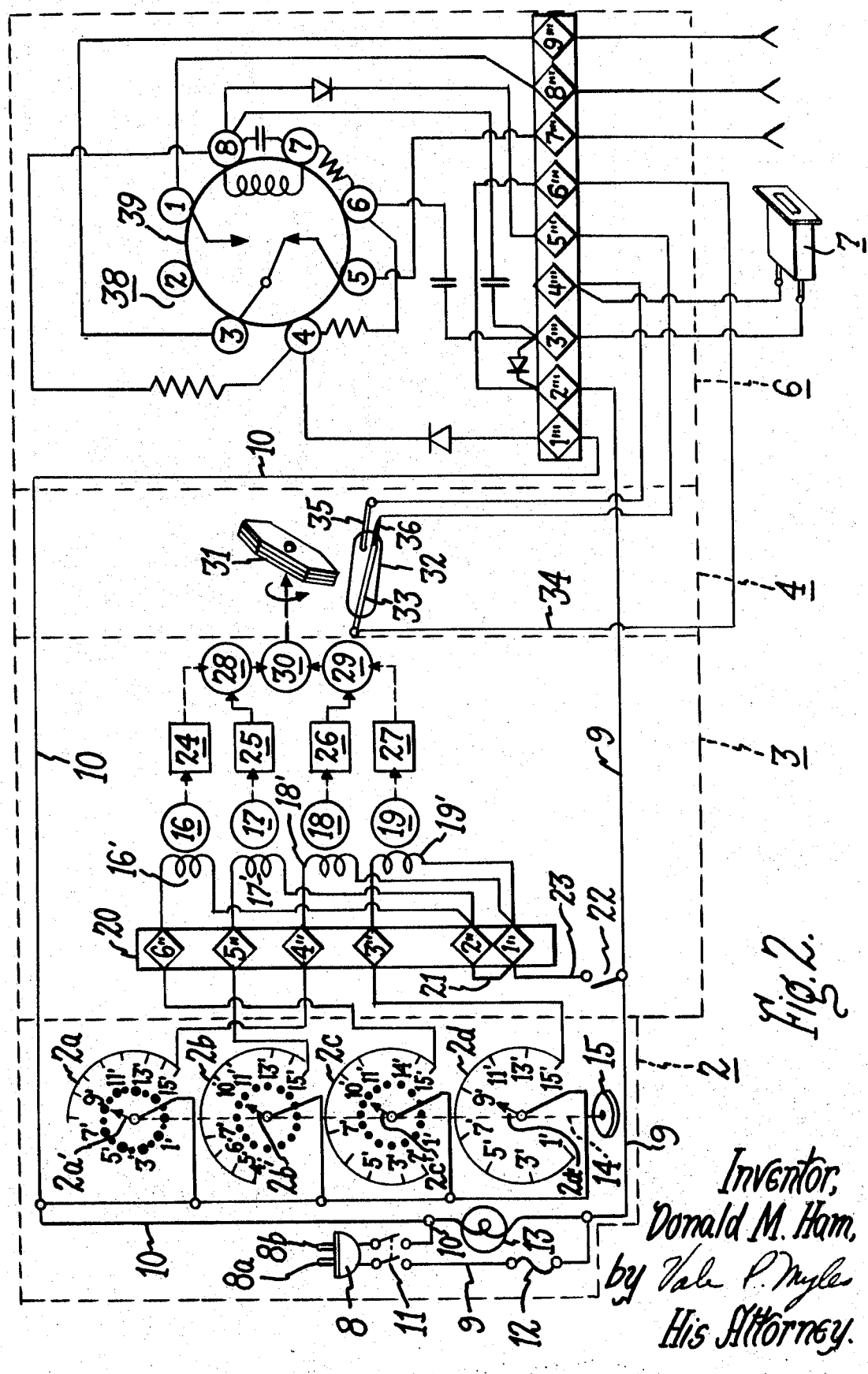
FIG. 2 is a schematic circuit diagram showing some of the operating features and interconnecting details of an impulse generator such as that illustrated in FIG. 1 of the drawing.

Now that the general functions of the major components and subassemblies of impulse generator 1 are understood, reference will be made to FIG. 2 of the drawing in order to further explain detailed features of this preferred embodiment of the invention. There is shown schematically in FIG. 2 a conventional two-prong terminal 8 that is connected in any well-known manner to an electrical cord containing two electrical conductors 9 and 10. The two prongs 8a and 8b on the plug 8 are adapted to be connected to a standard source of 117 volt, 60 Hertz electric power conveniently available in a laboratory or test shop. A two-pole switch 11 is electrically connected in series with the conductors 9 and 10 to provide a convenient means for opening or closing the power circuit from a source of power to the impulse generator 1. In order to protect the components of the generator 1 from damage due to overcurrents, a fuse 12 is electrically connected in series with the conductor 9. Also, a lamp 13 is shunted across the conductors 9 and 10 to provide a signal for indicating when the system is energized. It will be understood that other switching or indicating arrangements may be used, and additional circuitry might be employed, if desired, to afford suitable surge protection for the pulse generator 1. Such arrangements are relatively conventional and do not particularly influence the scope of the present invention, nor do they add to an understanding of it; therefore, further discussion of such possible alternatives will be omitted.

The impulse rate selector switch 2 comprises a gang-operated rotary switch having four separate sets of stationary contact 2a, 2b, 2c, and 2d. Each of these sets of contacts 2a–2d consists of fifteen separate, spaced-apart electrical contactors that are numbered 1' through 15' for identification purposes. Selector switch 2 also comprises four separate rotatably mounted contact blades 2a', 2b', 2c' and 2d'. Each of the blades 2a'–2d' are mounted in an aligned, relatively fixed position on a common shaft 14, which is indicated by a dotted line in FIG. 2. Also mounted on shaft 14 is a manually operable handle 15 that is adapted to be turned to move the contacts 2a'–2d', simultaneously, to any one of their respective fifteen positions in engagement with the fixed contactors 1'–15'. For the operation mode depicted in FIG. 2, the rotatable contact blades 2a'–2d' are shown in contact with the fixed contacts identified by number 9'.

As explained above with reference to the functional description of the component parts of generator 1, that was made with reference to FIG. 1, the basic function of selector switch 2 is to provide a simplified means for selectively energizing any one of the four synchronous motors or any combination of the four motors. The particular interconnection of the various fixed contacts 1'–15' of selector switch 2 that is used to accomplish this result can be understood when it is realized that each of the four rotatable contacts 2a'–2d' are, respectively, in series with a circuit that supplies electric energizing power to one of the four motors. Thus, it is necessary to move these rotatable contacts 2a'–2d' to complete one of these supply circuits to energize its associated motor. As can be seen in FIG. 2, on the various contact sets 2a–2d, only selected numbered contactors (identification numbers 1'–15', respectively) are electrically connected to the common switch bus that is electrically connected to each of the switch contacts numbered 15', respectively. In particular, in the set of fixed contactors 2a, only the contactors designated by identifying numbers 3'–15' are electrically connected together. On the set of fixed contactors 2b, only contactors identified by the numbers 4'–7' and 12'–15' are electrically connected together. On the fixed set of contacts 2c, only contactors designated by identifying numbers 2', 3', 6', 7', 10', 11', 14' and 15' are connected together. Finally, on fixed contacts 2d, only contactors identified by the numbers 1', 3', 5', 7', 9', 11', 13', and 15' are electrically connected together. With this particular connection arrangement, it will be seen that with the rotatable contacts 2a'–2d' in the switch position identified by number 9', only the two motors electrically connected to the set of fixed contacts 2a and 2d are energized. A further description of the operation of selector switch 2 will be given below in connection with the operation of the other component of impulse generator 1.

Now that the basic details of the operation of selector switch 2 are understood, the general features of impulse rate control assembly 3 will be described with further reference to FIG. 2. Central assembly 3 comprises four synchronous motors 16, 17, 18 and 19, as shown in FIG. 2, the field winding 16' of motor 16 is electrically connected by a suitable circuit means to a pair of terminals having identification numbers 2"–6' on a standard terminal board 20. The terminals 1" and 2" on terminal board 20 are shunted together by conductor 21 and are connected to one terminal of a switch 22 by conductor 23. The other terminal of switch 22 is in electrical contact with the primary power conductor 9, described above. In like manner, the field winding 17' of motor 17 is connected across terminals numbered 2"–5" on terminal board 20. Field winding 18' is connected across terminals numbered 1"–4" of terminal board 20 and, finally, field winding 19' of motor 19 is connected across terminals numbered 1"–3" on board 20. The terminals numbered 3"–6" on terminal board 20 are connected, respectively, by any suitable conductor means, as shown, to the fixed contactors designated by identifying number 15' on the fixed contact set 2d, 2a,2b, and 2c. Accordingly, when main power switch 11 is closed and auxiliary switch 22 is closed, the selective energization of the motors 16–19 is controlled exclusively by selector switch 2.

Each of the motors 16–19 has a drive shaft that is operably mounted to rotate at a predetermined constant speed when its motor is energized. As will become apparent from the description that follows, the respective speeds of rotation of the individual motors could be different from one another, but in the preferred embodiment of the invention, being described, each of the motors 16–19 is designed to rotate at a substantially identical speed. The drive shafts of motors 16–19 are coupled respectively in driving engagement to reduction gear trains 24, 25, 26 and 27, which are illustrated schematically by the block diagrams shown in FIG. 2. A more detailed description of this gear train arrangement will be given below. In turn, the gear trains 24–27 each have output gears that are coupled in meshing engagement respectively with one of a pair of differential gear drive mechanisms 28 and 29. A third differential gear drive mechanism 30 has a pair of input gears that are coupled in meshing engagement respectively with output gears of the differential gear mechanisms 28 and 29. This unique impulse rate control assembly 3 is arranged to provide 15 different rates of rotation of the output gear of differential gear drive mechanism 30.

Accordingly, when a suitable electrical impulse generating means such as the rotatably mounted magnet 31 of impulse generator 4 is operatively connected to the output gear of differential gear drive mechanism 30 its rotation adjacent a magnetically actuated reed switch, such as the reed switch 32, serves to generate a different rate of electrical impulses for each different combination of motors that is selectively energized through the selector switch 2. For the purpose of understanding the impulse generating ability of reed switch 32, it is only necessary to understand that the movable contact 33 of switch 32 is electrically connected by any suitable conductor means, such as conductor 34 to a source of electric power. In this form of the invention, the conductor 34 is connected to a terminal having identification number 6''', which in turn is shunted to terminal number 2''' and, thus, to primary power conductor 9. Accordingly, it will be seen that when magnet 31 rotates to cause movable contact 33 of switch 32 to be alternately moved back and forth between the two fixed switch contacts 35 and 36, impulses of current will be transmitted to these fixed contacts. As pointed out above, in some applications of the invention it may be desirable to directly connect the fixed contacts 35 and 36 of switch 32 to a load, such as a demand meter that is being tested. However, in this embodiment of the invention, the fixed contacts 35 and 36 are connected by suitable conductor means to terminals 4''' and 5''' on terminal board 37 of the impulse amplifier 5.

The impulse amplifier 5 may be any suitable amplifying device that will provide adequate output power to operate the type of loads normally encountered in use of the impulse generator of the invention. In the preferred embodiment of the invention, the impulse amplifier 5 comprises a mercury wetted relay 38, which may be of any suitable conventional design. In the preferred embodiment of the invention, relay 38 is a Potter & Brumfield JML 5200-81 relay, which is described in detail in a publication identified as, "Bulletin 2, Form No. 13C167," that was issued in the year 1965 by Potter & Brumfield, a Division of American Machine & Foundry Co. of Princeton, Indiana. Since the amplifying function performed by the mercury wetted relay arrangement 38 is not an essential part of the present invention, a detailed description of its associated circuitry is not necessary to an understanding of the invention. However, to facilitate an understanding of the invention coupled to relay 38, it should be appreciated that one suitable circuit arrangement for the standard mercury wetted relay 38, in relation to the terminals numbered 1'''–9''' of terminal board 37 is illustrated in FIG. 2. It will be understood that the relay 38 operates to amplify the electrical impulses delivered to terminals 4''' and 5''' of terminal board 37 from fixed contacts 35 and 36 respectively of magnetically actuated impulse generating switch 32 by switching the voltage responsive relay 39 to control the impulses of current generated by it at output terminals 7'''-9'''.

Any desired utilization means may be connected to the terminal 7'''-9''' to be actuated by the impulses produced at these terminals by the operation of impulse generator 1. In addition to such a utilization means, the counter 7, which may be of any standard impulse actuated type, can be connected to these output terminals or it may be connected, as shown in FIG. 2, to terminals 3''' and 4''' of terminal board 37, so that it counts the output of switch 32, directly.

Figure 3:
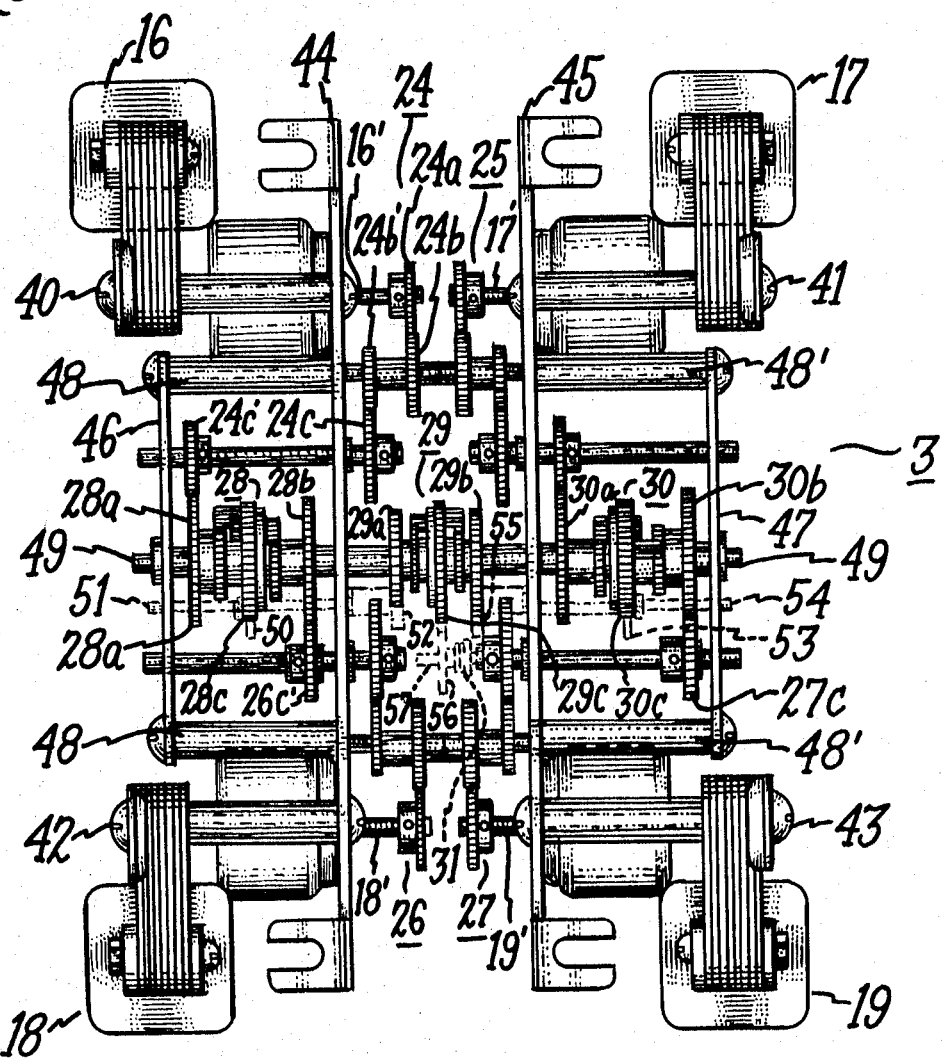
FIG. 3 is a top plan view of an impulse rate control assembly of a multirate impulse generator such as that illustrated in FIGS. 1 and 2 of the drawing.

Since the extremely accurate and ruggedly reliable impulse rate control assembly 3 of my invention is primarily responsible for affording the numerous advantages, and satisfying the objectives of the invention outlined above, reference will now be made to FIG. 3 of the drawing to describe the component parts of assembly 3 in detail. In the manner described generally above, the assembly 3 comprises four identical electric synchronous motors 16, 17, 18 and 19. These motors are mounted in any suitable manner, such as by bolts 40, 41, 42 and 43 respectively to a pair of parallel metal frame members 44 and 45 that are maintained in spaced apart relationship by other conventional frame members (not shown). An additional pair of frame plate members 46 and 47 are also mounted in spaced relation with respect to frame members 44 and 45 by additional conventional bolts and spacing means 48 and 48'. An axle 49 extends through apertures in frame members 44–47 to provide a means for rotatably mounting the respective input and output gears of the three differential gear drive mechanisms 28, 29 and 30. Pursuant to the objective of the present invention to make the impulse generator 1 as simply as possible, all three of the gear drive mechanisms 28–30 are identical in structure. A detailed description of the characteristic features and operating principles of these gear drive mechanisms will be given below. For the moment, it is only necessary to understand that each of them comprises; a pair of input gears 28a–28b, 29a–29b and 30a–30b respectively; and a single output gear 28c, 29c and 30c respectively.

In addition to the identical nature of the differential gear drive mechanisms 28–30, the reduction gear trains 24–27 that respectively couple the motors 16–19 in driving engagement with the input gears 28a, 30a, 28b, and 30b of differential drive gear mechanisms 28 and 30 are quite similar, in that they have an identical number of gears that are connected in meshing engagement in a substantially equivalent arrangement. However, the reduction ratio of each of the gear trains 24–27 is different in order to provide the novel multirate impulse generator control mechanism of the present invention.

Because of these simplifying similarities in structure and function, in order to understand the impulse control feature of the invention, it is only necessary to appreciate that the reduction ratio of each of the gear trains 28–27, with respect to one another, double sequentially. Thus, these ratios are set so that the output gear 27c of gear train 27 rotates at a rate of 200 revolutions per 15-minute interval, while the output gear 24c' of gear train 24 operates at a rate of 400 revolutions per 15-minute interval. And the output gear of gear train 25 rotates at a rate of 800 revolutions per 15-minute interval, whereas the output gear of gear train 26 rotates at a rate of 1600 revolutions per 15-minute interval. The synchronous motors 16–19 each drive their respective drive shafts 16'–19' at a rate of 60 revolutions per minute, or 900 revolutions per 15-minute interval. Thus, considering gear train 24, for example, it will be seen that in the driving coupling from disc gear 24a, which is mounted on drive shaft 16' for rotation therewith, through reduction gears 24b–b' and 24c–c' to the input gear 28a of differential gear gear drive mechanism 28, the reduction ratio must be from 900 to 400.

Since, as noted above, the other gear trains 25–27 are similar in arrangement, and number of individual reduction gears, to that of gear train 24 the individual gears of these trains need not be described to clarify the operation of the present invention. It will, of course, be appreciated that the relative sizes of the gears in these other gear trains will vary to afford the other reduction ratios noted in the preceding paragraph. In addition to the rate reducing function of the reduction gear trains 24–27, it must be understood that each of the differential gear drive mechanisms 28–30 in this embodiment of the invention, is operable to reduce the rate of rotation of its output gear with respect to either of its input gears by a further predetermined ratio, which in this case is a ratio of 2:1. For example, if motor 19 is energized (by placing selector switch 2 in the position identified by number 1') it rotates at a rate of 900 revolutions per 15-minute interval. Through its output shaft 19', it drives the reduction gear train 27 which steps the rate of rotation delivered to its output gear 27c down to 200 revolutions per 15-minute interval. Then differential gear drive mechanism 30 further reduces the rate of rotation to 100 revolutions per 15-minute interval, at its output gear 30c, and the rate is further reduced to 50 revolutions per 15-minute interval by the reducing effect of differential gear drive mechanism 29. Of course, due to the fact that both poles of rotatably mounted magnet 31 actuate the movable contact 33 of reed switch 32 (see FIG. 2) the 50 revolution per 15-minute interval rate results in the production of 100 impulses per 15-minute interval being produced at the terminals 4''', 5''' of terminal board 37.

In order to provide a better understanding of the structure and functioning of differential gear drive mechanisms 28–30, reference is now made to FIG. 4 of the drawing, in which an enlarged view of the differential gear drive mechanism 28 is depicted. Since the mechanism 28 is identical to the mechanisms 29 and 30, an understanding of it will afford a complete understanding of all three of the differential mechanisms 28–30. As described above with reference to FIG. 3, the differential gear drive mechanism 28 has two input gears 28a and 28b, which are driven respectively by the last pinion gear 24c' in the gear train 24 that couples it to motor 16, and the last pinion gear 26c' of gear train 26 which is in driven engagement with motor 18. The differential mechanism 28 has one output gear 28c that is in continuous meshing engagement with a coupling gear 50 that is mounted in fixed relation to a shaft 51 which is journaled between the frame members 44 and 46, and which has a second pinion gear 52 (see FIG. 3) mounted in fixed relation to it and the shaft 51, on the other end of shaft 51. The gear 52 is in continuous driving engagement with one of the input gears 29a of the differential gear drive mechanism 29. At this point, it may be noted that a similar coupling gear arrangement is provided between the output gear 30c of differential gear drive mechanism 30 (see FIG. 3) in order to couple it to the other input gear 29b of differential gear drive mechanism 29. Specifically, a coupling gear 53 mounted on a shaft 54, in fixed relation thereto, drives a second gear 55, also mounted in fixed relation on shaft 54, thereby to afford a continuously coupled driving engagement between the output gear 30c of mechanism 30 and the input gear 29b of mechanism 29. Finally, it will be understood that a suitable drive gear 56 (also shown in FIG. 3) is coupled in continuously meshing engagement with the output gear 29c of mechanism 29 to provide a means for rotating magnet 31, which is mounted in fixed relation with respect to shaft 57, which is journaled between supporting frame members 44 and 45, and also supports the drive gear 56 in fixed relation thereon.

Continuing, now, with the description of differential drive gear mechanism 28, and referring again to FIG. 4 of the drawing, it should be understood that each of the gears 28a, 28b, and 28c are mounted on shaft 49 and are freely rotatable with respect thereto, so that the relative positions of each of these gears is determined solely by their respective interrelated meshing engagement through the pinion gears that will now be described in detail. Actually, gear 28a is rigidly mounted on a short hollow shaft 58 that also supports, in fixed relation with respect to it, a pinion gear 59, so that the input gear 28a and pinion gear 59 rotate in unison. In like manner, input gear 28b is mounted in fixed relation on short shaft 60 which also has mounted on its other end a pinion gear 61 that rotates in unison with the input gear 28b. Output gear 28c may be directly mounted on shaft 49 or, as in this preferred embodiment of the invention, it may be mounted on a short shaft 62, which in turn is rotatably mounted on the shaft 49.

In order to provide the differential gearing effect of mechanism 28, a pair of pinion gears 63a and 63b are rotatably mounted on opposite sides of output gear 28c on a pin 64 that is journaled in a suitable aperture or bearing through the gear 28c. Both pinion gears 63a and 63b are fixed in relation to pin 64, so that they rotate in unison. A second eccentrically positioned pin 65 is mounted in fixed relation on the upper surface of output gear 28c and supports, in rotatably mounted relation with respect thereto, another pinion gear 66 that is in continuously meshing engagement with pinion gear 63a and gear 59. Since the pinion gear 63b on the opposite side of output gear 28c is in continuous meshing engagement with the gear 61, it can be seen that rotation of either input gear 28a or 28b will cause relative rotation between it and the pinion gears 63b and 66 respectively, and the other input gear. Moreover, if both input gears 28a and 28b are driven simultaneously the output gear 28c will be driven through pinion gears 63a–63b and 66 at a rate of speed proportional to the sum of the rates of speed at which the two input gears are driven. As mentioned above, the differential gear drive mechanism may have any desirable predetermined reduction ratio suitable to given applications, and in this embodiment of the invention the reduction ratio if 2:1. It should also be noted that there is sufficient inherent friction in the respective gear trains 24 and 26 to prevent one of these trains from driving the other gear train in a reverse direction when such other gear train is not being driven in its forward direction in response to an input from its associated drive motor (16 or 18). Of course, in some applications it may be desirable to provide a pawl and ratchet mechanism, or other suitable braking means, to insure that only forward rotation occurs in each gear train, so that if only one of the gear trains driving output gear 28c is energized there will be no distortion in the rate of rotation of the output gear in relation to the rate of rotation of the energized input gear train.

It is believed that the foregoing description of the differential gear drive mechanism 28 is sufficient to enable those skilled in the art to practice the present invention; however, if a further detailed description of a somewhat related differential gear drive mechanism is desired, reference may be made to U.S. Pat. No. 3,434,659-Ham et al., which issued on March 25, 1969 and is assigned to the assignee of the present invention. Moreover, those skilled in the art will appreciate that various different materials are suitable for forming the different gears, mounting shafts and frames of the impulse rate control assembly 3, described above. However, it may be noted that in the preferred embodiment of the invention described herein, the frame plate members 44–47 are formed of flat bass stock, and all of the gear supporting shafts, such as shafts 49, 51 and 57, are formed of steel. On the other hand, all of the gears, such as those in gear trains 24–27, are formed of precision-cut brass discs. Of course, it will also be apparent to those skilled in the art that various modifications and alternative embodiments of the invention described herein may be made without departing from its true scope and spirit. Accordingly, it is my intention to encompass within the scope of the following claims all such alternative embodiments and modifications of my invention.

What I claim as new and desire to secure by Letters Patent of the United States is:

1. A multirate electrical impulse generator comprising:
    a plurality of synchronous motors each having a drive shaft that is operable to rotate at a predetermined constant speed when its motor is energized,
    a plurality of gear trains each coupled respectively in driven engagement to one of said drive shafts to be driven thereby,
    at least three differential gear drive mechanisms, each having at least two input gears and at least one output gear, said input and output gears being coupled to one another in meshing engagement,
    the input gears of one of said differential gear drive mechanisms being coupled in driven engagement respectively to the output gears of the other two differential gear drive mechanisms, whereby the output gear of said one of said differential gear drive mechanisms is driven at a rate that is proportional to the sum of the output gear drive rates of said other two differential gear drive mechanisms,
    each of the input gears of said other differential gear drive mechanisms being coupled in driven engagement respectively to a different one of said gear trains, whereby the respective output gears of said other differential gear drive mechanisms driven at a rate that is proportional to the sum of the drive rates of the gear trains coupled to the input gears thereof,
    actuating means for selectively energizing one or more of said motors simultaneously, thereby to drive one or more of said gear trains,
    and electrical impulse generating means operatively connected to the output gear of said one of said differential gear drive mechanisms, said impulse generating means being operable to generate electrical impulses at a rate directly proportional to the rate at which the output gear of said one of said differential gear drive mechanisms is driven, whereby said impulse generating means generates a different rate of electrical impulses for each different combination of motors selectively energized by said actuating means.

2. An impulse generator as defined in claim 1 wherein said plurality of synchronous motors comprises four motors, and each of said motors operates at substantially the same synchronous speed of rotation.

3. An impulse generator as defined in claim 2 wherein each of said gear trains is a reduction gear train that is operable to reduce the rate of rotation of the last gear in the train with respect to the first gear in the train by a predetermined reduction ratio, and wherein each of said reduction ratios is different.

4. An impulse generator as defined in claim 3 wherein there is a first, second, third and fourth gear train and the reduction ratio of said gear trains in relation to the synchronous speed of rotation of said motors is, respectively: 1, 2, 4 and 8.

5. An impulse generator as defined in claim 1 wherein each of said differential gear drive mechanisms is substantially identical in structure.

6. An impulse generator as defined in claim 5 wherein each of said differential gear drive mechanisms is operable to reduce the rate of rotation of its output gear with respect to either of its input gears by a predetermined ratio.

7. An impulse generator as defined in claim 6 wherein said predetermined ratio is: 2.

8. An impulse generator as defined in claim 1 wherein said electrical impulse generating means comprises; a rotatably mounted magnet coupled in driven relationship to the output gear of said one of said differential gear drive mechanisms, and a magnetically actuated switch mounted adjacent said magnet and electrically connected to a source of electric power, said switch being operable to cause electrical impulses at at least one output terminal thereof in response to its being intermittently actuated by rotation of said magnet.

9. An impulse generator as defined in claim 8 in combination with utilization means responsive to said electrical pulses generated at the switch terminal, and circuit means connecting said utilization means in operating relationship to the output terminals of said switch.

10. An impulse generator as defined in claim 9 wherein said switch has three contacts, only one of which is movable, and said source of power is connected to the movable contact of the relay.

11. An impulse generator as defined in claim 9 wherein said utilization means comprises a counting apparatus that is operable to count the number of impulses occurring at said output terminal of the switch.

* * * * *

UNITED STATES PATENT OFFICE
CERTIFICATE OF CORRECTION

Patent No. 3,626,261      Dated December 7, 1971

Inventor(s) Donald M. Ham

It is certified that error appears in the above-identified patent and that said Letters Patent are hereby corrected as shown below:

Col. 1, line 38, "]pparatus" should be -- apparatus --

Col. 3, line 42, "3' " should be -- 8' --

Col. 3, line 65, "6' " should be -- 6'' --

Col. 5, line 57, after "ratio" delete -- of each --

Col. 5, line 72, before "drive" delete -- gear --

Col. 7, line 32, "if" should be -- is --

Col. 7, line 60, "bass" should be -- brass --

Signed and sealed this 6th day of June 1972.

(SEAL)
Attest:

EDWARD M. FLETCHER, JR.
Attesting Officer

ROBERT GOTTSCHALK
Commissioner of Patents